(12) United States Patent
Koga et al.

(10) Patent No.: US 12,391,198 B2
(45) Date of Patent: Aug. 19, 2025

(54) VIBRATION DAMPING MOUNTS FOR BATTERIES IN ELECTRIC REFUSE VEHICLE

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Byron, MN (US); Zachary L Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Chad K. Smith, Omro, WI (US)

(73) Assignee: Oshkosh Corporation, Oshkosh, WI (US)

( * ) Notice: Subject to any disclaimer, the term of this patent is extended or adjusted under 35 U.S.C. 154(b) by 872 days.

(21) Appl. No.: 17/484,051

(22) Filed: Sep. 24, 2021

(65) Prior Publication Data

US 2022/0097633 A1 Mar. 31, 2022

Related U.S. Application Data

(60) Provisional application No. 63/084,344, filed on Sep. 28, 2020.

(51) Int. Cl.
*B60R 16/033* (2006.01)
*B65F 3/02* (2006.01)
*H01M 50/242* (2021.01)
*H01M 50/249* (2021.01)

(52) U.S. Cl.
CPC .............. *B60R 16/033* (2013.01); *B65F 3/02* (2013.01); *H01M 50/242* (2021.01); *H01M 50/249* (2021.01); *B60L 2200/40* (2013.01); *B65F 2003/0269* (2013.01); *B65F 2003/0279* (2013.01); *H01M 2220/20* (2013.01)

(58) Field of Classification Search
CPC . B60R 16/033; H01M 50/249; H01M 50/242; H01M 2220/20; B65F 3/02; B65F 2003/0269; B65F 2003/0279; B60L 2200/40
USPC ........................................................ 307/10.7
See application file for complete search history.

(56) References Cited

U.S. PATENT DOCUMENTS

| | | | | |
|---|---|---|---|---|
| 8,550,196 | B2 * | 10/2013 | Ross ................ | H02K 16/02 |
| | | | | 903/906 |
| 9,484,602 | B1 * | 11/2016 | Podolefsky ....... | H01M 50/204 |
| 2007/0080662 | A1 * | 4/2007 | Wu .................. | B60L 58/16 |
| | | | | 320/110 |
| 2012/0306263 | A1 * | 12/2012 | Tashiro ............ | B60L 58/20 |
| | | | | 307/9.1 |

(Continued)

*Primary Examiner* — Alfonso Perez Borroto
(74) *Attorney, Agent, or Firm* — Foley & Lardner LLP

(57) ABSTRACT

A refuse vehicle including a chassis, a body assembly coupled to the chassis, the body assembly defining a refuse compartment, an electric energy system, the electric energy system including one or more battery cells and control hardware, the electric energy system coupled to the body and configured to be accessed through an opening in the body, and one or more vibration isolation devices, the one or more vibration isolation devices structured to reduce effects of disruptive forces on the electric energy system.

15 Claims, 10 Drawing Sheets

(56) References Cited

U.S. PATENT DOCUMENTS

| | | | |
|---|---|---|---|
| 2015/0321657 A1* | 11/2015 | Lasson | B60L 3/003 |
| | | | 180/65.265 |
| 2017/0043823 A1* | 2/2017 | Podolefsky | H02P 25/02 |
| 2018/0138721 A1* | 5/2018 | Wu | B60L 53/62 |
| 2019/0193934 A1* | 6/2019 | Rocholl | B65F 3/041 |
| 2020/0079266 A1* | 3/2020 | Hoehner | B60G 17/0565 |
| 2020/0266496 A1* | 8/2020 | Podolefsky | H01M 50/204 |

\* cited by examiner

VIBRATION DAMPING MOUNTS FOR BATTERIES IN ELECTRIC REFUSE VEHICLE

CROSS REFERENCE TO RELATED APPLICATION

This application claims priority to U.S. Provisional Patent Application No. 63/084,344, filed Sep. 28, 2020, the content of which is hereby incorporated by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle including a chassis, a body assembly coupled to the chassis, the body assembly defining a refuse compartment, an electric energy system, the electric energy system comprising one or more battery cells and control hardware, the electric energy system coupled to the body and configured to be accessed through an opening in the body, and one or more vibration isolation devices, the one or more vibration isolation devices structured to reduce effects of disruptive forces on the electric energy system.

Another embodiment relates to an electric energy system for a vehicle including one or more battery cells structured to be coupled to a body of the vehicle and one or more vibration isolation devices. The one or more battery cells may be configured to provide electrical power to the vehicle. The vibration isolation devices may be positioned proximate to the one or more battery cells. The one or more vibration isolation devices may further be structured to reduce an effect of a disruptive force on the one or more battery cells during operation of the vehicle.

Yet another embodiment relates to a control system for a vehicle. The control system includes one or more vibration isolation devices, one or more sensors, and a controller. The one or more vibration isolation devices may be structured to reduce an effect of disruptive forces. The one or more sensors may be configured to record data associated with the vehicle or the one or more vibration isolation devices. The controller further includes a network interface, a processor, and a memory device. The network interface may be configured to communicate with the one or more sensors and the one or more vibration isolation devices. The memory device may be configured to store instructions thereon that, when executed by the processor, cause the processor to receive disruptive force data from the one or more sensors. The instructions, when executed by the processor, may further cause the processor to determine, based on the received disruptive force data, an amount of adjustment for the one or more vibration isolation devices. In addition, the instructions, when executed by the processor, may cause the one or more vibration isolation devices to adjust according to the determined amount of adjustment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an energy storage and/or generation system for a refuse vehicle is disclosed herein. The energy storage and/or generation system of the present disclosure provides many advantages over conventional systems. By combining the interchangability of a modular energy system with vibration isolation devices, the energy storage and/or generation system may be positioned to evenly distribute the weight of batteries across the vehicle while also reducing the effect of vibration on the energy storage and/or generation system. Further, because the vibration isolation devices reduce the effect of vibration on the energy storage and/or generation system, the energy storage and/or generation system can be located in more vibration-intensive positions (such as proximate to the wheels), thereby increasing the ability to position the energy storage and/or generation in a location that is easily accessible and/or removable from the refuse vehicle. Ease of access and removability reduce the labor involved in servicing an energy storage and/or generation system, making routine inspection and servicing more feasible and thereby increasing the life of the energy storage and/or generation system. By reducing the effects of vibration on the energy storage and/or generation system, the system improves the functionality and working life-cycle of the energy storage and/or generation system, thereby reducing operating costs through the reduction of repair and replace costs.

The system may include a controller. The controller may monitor various systems within the refuse vehicle, including the vibration isolation devices. The controller may receive data from sensors within the system, compare the data to expected values under normal operating conditions, and adjust the operation parameters of components of the system in order to address vibration or similar disruptive forces.

Overall Vehicle

Figure 1:
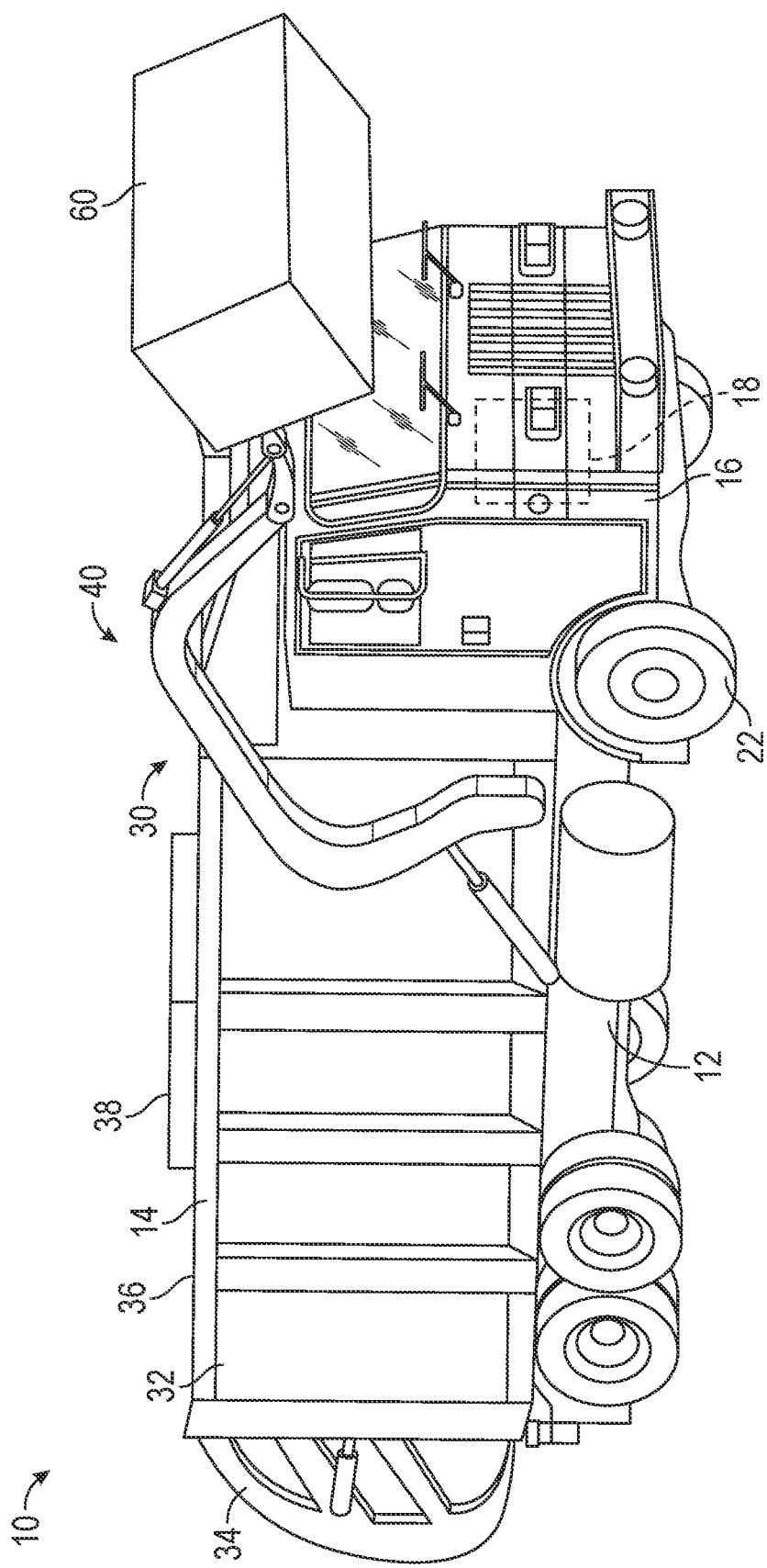
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.) as well as components that can execute commands automatically to control different subsystems within the vehicle (e.g., computers, controllers, processing units, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

Throughout operation of the refuse vehicle, the energy storage and/or generation system 20 is subject to vibration and other similarly disruptive forces. These forces can degrade system 20 performance by displacing the one or more rechargeable batteries out of alignment or by damaging other components. Further, these disruptive forces can cause cables (such as those connecting the energy storage and/or generation system 20 to the electric motor 18, wheels 22, or electric actuators) to become un-coupled, thereby preventing or interfering with operation of the refuse vehicle. The inclusion of vibration isolation devices 24 throughout the refuse vehicle 10 serve to reduce or eliminate the effect that these disruptive forces have on the energy storage and/or generation system 20 by minimizing the effect of the disruptive forces through dampening, by isolating the effect of the disruptive forces to components other than the energy storage and/or generation system 20, or by diverting/redirecting the effect of the disruptive forces away from the energy storage and/or generation system 20. These vibration isolation devices 24 may be any type of material or configuration of material that can apply a force to keep the energy storage and/or generation system 20 in place while also absorbing or diverting vibration and other similarly disruptive forces. In those embodiments in which the vibration isolation devices 24 divert the vibration, the vibration is diverted to an area of the refuse vehicle 10 that is structured to receive the vibration without structural damage, such that the vibration is not suppressed but is absorbed by part of the refuse vehicle 10 away from important components (e.g., energy storage and/or generation system 20). As such, the vibration isolation devices may include coil springs, rubber pads, elastomer springs, gas shocks, and/or silicone padding. The vibration isolation devices 24 may be any combination of the above, such a set of coil springs combined with a rubber pad to leverage the flexibility of the coil springs with the sturdiness of the rubber pad.

In some embodiments, the vibration isolation devices 24 may be coupled or fixed to energy storage and/or generation system 20 cables (such as those that connect the energy storage and/or generation system 20 to refuse vehicle 10 components). In these embodiments, the vibration isolation devices 24 are structured to reduce, isolate, or divert the effects of vibration on the cables. The vibration isolation devices 24 may be located at the connection points (e.g., ports) of the cables such that vibration is reduced, isolated, or diverted from the point of contact between the cables and the energy storage and/or generation system 20. Alternatively, the vibration isolation devices 24 may be located along the length of the cables (i.e., the entire cable is constructed of a flexible material), such that vibration is reduced by diverting the vibration or similar disruptive forces along the entire length of the cable rather than at a connection point.

In some embodiments, such as in those embodiments where the vibration isolation devices 24 include one or more springs, the vibration isolation devices 24 are structured to reduce or divert vibration by compressing in response to the applied force (i.e., vibration), thereby absorbing the effects of the applied force. The vibration isolation devices 24 are structured to subsequently expand to a pre-applied force length, but the expansion force applied to the energy storage and/or generation system 20 from the vibration isolation devices 24 returning to normal length is significantly less than the original applied force that led to the vibration isolation devices 24 originally compressing. As such, the vibration isolation devices 24 essentially transform the disruptive forces of vibration to a lighter force value that has little to no effect on the energy storage and/or generation system 20.

In other embodiments, such as in those embodiments where the vibration isolation devices 24 include one or more pads, the vibration isolation devices 24 are structured to reduce or divert vibration by intercepting the vibration and other disruptive forces before the forces reach the energy storage and/or generation system 20 and dispersing the forces across the entire surface area of the vibration isolation devices 24. As such, the same amount of force that would otherwise be applied to a small area (i.e., the one or more points of contact between the energy storage and/or generation system 20 and the vehicle 10) are dispersed across a larger surface area, thereby reducing the effect of the force on the energy storage and/or generation system 20.

The vibration isolation devices 24 are fixed at one or more points of contact between the energy storage and/or generation system 20 and the refuse vehicle 10, such that the energy storage and/or generation system 20 does not make direct contact with the refuse vehicle 10. By being located between the energy storage and/or generation system 20 and the refuse vehicle 10, the vibration isolation devices 24 serve as a pathway for any forces (such as vibration) passing from the refuse vehicle 10 to the energy storage and/or generation system 20 and are able to divert, reduce, or eliminate such forces in order to protect the energy storage and/or generation system 20.

The controller 120 is configured to control and monitor (i.e., by receiving data from sensors) the vibration isolation devices 24 and various components of the refuse vehicle 10 as will be discussed in greater detail with references to FIG. 2. The controller 100 may include a second battery such that the controller 120 may operate independently of the energy storage and/or generation system 20. In some embodiments, the vibration isolation devices 24 include various hydraulic cylinders and actuators present on the refuse vehicle. In these embodiments, the refuse vehicle 10 includes a hydraulic pump that can provide pressurized hydraulic fluid to each of the hydraulic cylinders and actuators in order to control a position or orientation of the vibration isolation devices 24 such that the vibration isolation devices 24 can be manipulated to reduce, isolate, or divert vibration from the energy storage and/or generation system 20. For example, the controller 120, responsive to detecting an upcoming period of high vibration (e.g., a marked construction zone), may cause the hydraulic pump to provide or remove pressurized hydraulic fluid from the various hydraulic cylinders in order to keep the energy storage and/or generation system 20 and related components flat or relatively motionless through the period of high vibration.

Figure 2:
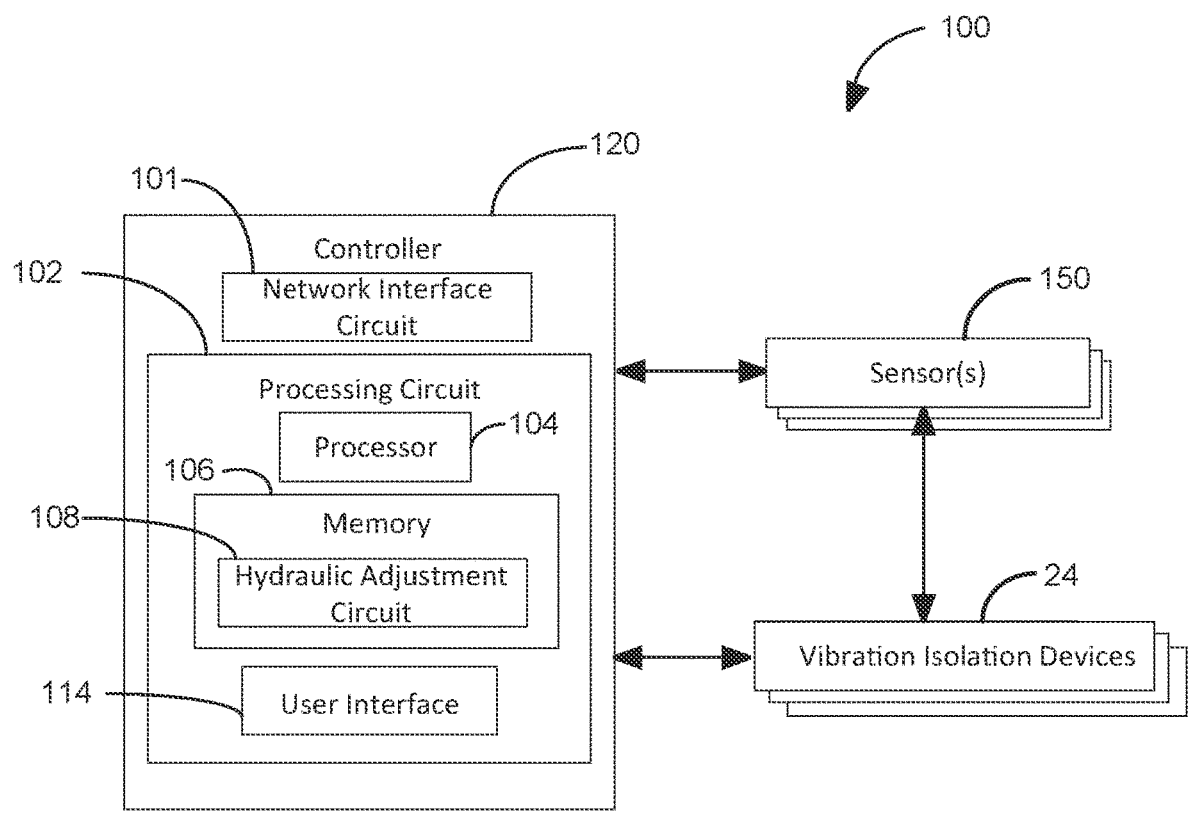
FIG. 2 is a schematic view of a controller system according to an exemplary embodiment.

Referring now to FIG. 2, a controller system 100 is shown according to an example embodiment. For example, the controller system 100 may be implemented and used by the refuse vehicle 10. The controller system 100 includes the controller 120. The controller system 100 may include one or more sensor(s) 150 configured to record data associated with the refuse vehicle 10 or the vibration isolation devices 24. The sensor(s) 150 may include any type of sensor that may record data corresponding to the refuse vehicle 10 or vibration isolation devices 24 including a position sensor, an elevation sensor, a speed sensor, an electric current sensor, pressure sensors, fuel level sensors, flow rate sensors, voltage detectors, noise meters, air pollution sensors, mass flow rate sensors, etc. and any combination thereof.

In various embodiments, the controller 120 is communicably coupled to sensor(s) 150, such that the data recorded by the sensor(s) 150 may be saved and analyzed. The controller 120 is also communicably coupled to the vibration isolation devices 24 such that the controller 120 may control the vibration isolation devices 24 (e.g., by sending operating parameters to the various hydraulic cylinders). In certain embodiments, the controller 120 includes a network interface circuit 101 configured to enable the controller 120 to exchange information over a network. The network interface circuit 101 can include program logic that facilitates connection of the controller 120 to the network (e.g., a cellular network, Wi-Fi, Bluetooth, radio, etc.). The network interface circuit 101 can support communications between the controller 120 and other systems, such as a remote monitoring computing system. For example, the network interface circuit 101 can include a cellular modem, a Bluetooth transceiver, a radio-frequency identification (RFID) transceiver, and a near-field communication (NFC) transmitter. In some embodiments, the network interface circuit 101 includes the hardware and machine-readable media sufficient to support communication over multiple channels of data communication.

The controller 120 is shown to include a processing circuit 102 and a user interface 114. The processing circuit 102 may include a processor 104 and a memory 106. The processor 104 may be coupled to the memory 106. The processor 104 may be a general purpose or specific purpose processor, an application specific integrated circuit (ASIC), one or more field programmable gate arrays (FPGAs), a group of processing components, or other suitable processing components. The processor 104 is configured to execute computer code or instructions stored in the memory 106 or received from other computer readable media (e.g., CDROM, network storage, a remote server, etc.).

The memory 106 may include one or more devices (e.g., memory units, memory devices, storage devices, etc.) for storing data and/or computer code for completing and/or facilitating the various processes described in the present disclosure. The memory 106 may include random access memory (RAM), read-only memory (ROM), hard drive storage, temporary storage, non-volatile memory, flash memory, optical memory, or any other suitable memory for storing software objects and/or computer instructions. The memory 106 may include database components, object code components, script components, or any other type of information structure for supporting the various activities and information structures described in the present disclosure.

The memory 106 may be communicably connected to the processor 104 via processing circuit 102 and may include computer code for executing (e.g., by the processor 104) one or more of the processes described herein.

A hydraulic adjustment circuit 108 is configured to collect data collected by the sensors 150 and to adjust the various hydraulic cylinders in the vibration isolation devices 24 accordingly. For example, the hydraulic adjustment circuit 108 may receive indication from the sensors 150 that an upcoming stretch of road is under construction and will send signals to the hydraulic pump to adjust the amount of hydraulic fluid in the various hydraulic cylinders. More specifically, the sensors 150 may include a positioning sensor (e.g., global positioning system device, location triangulating device, etc.) that is configured to determine a current location of the vehicle 10. The current location of the vehicle 10 may then be cross-referenced with known location or area (e.g., geofenced area) in order to determine that the vehicle 10 is approaching or is within a geofenced area associated with heightened disruptive forces (e.g., road construction, etc.). In another example, the sensors 150 may include an accelerometer or other motion sensor configured to determine when the vehicle 10 is experiencing disruptive forces beyond a certain threshold. In yet another example, the sensors 150 may include a microphone or other noise sensor configured to detect one or more sounds associated with vibrations or other disruptive forces. In various other examples, the sensors 150 may record data associated with a change in disruptive forces (e.g., a change from smooth pavement to rough pavement, etc.) in order to determine that the various hydraulic cylinders may advantageously be adjusted to effectively reduce the effects of said disruptive forces. Incorporation of data from the sensors 150 thus allows for the dynamic adjustment of the vibration isolation devices 24 according to varying vehicle conditions.

By adjusting the amount of hydraulic fluid in the various hydraulic cylinders, the hydraulic pump changes a positioning of the hydraulic cylinders (such that the hydraulic cylinders expand with the influx of hydraulic fluid and compress with the outflow of hydraulic fluid). By incorporating data collected by the sensors 150, the hydraulic adjustment circuit 108 can fine tune adjustments to the hydraulic cylinders so that the hydraulic cylinders adjust in accordance with the received vibration and similar disruptive forces in order to dampen or negate their effects on the energy storage and/or generation system 20 coupled (removably or fixedly) to the vibration isolation devices 24.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Energy Storage and/or Generation System

Figure 3:
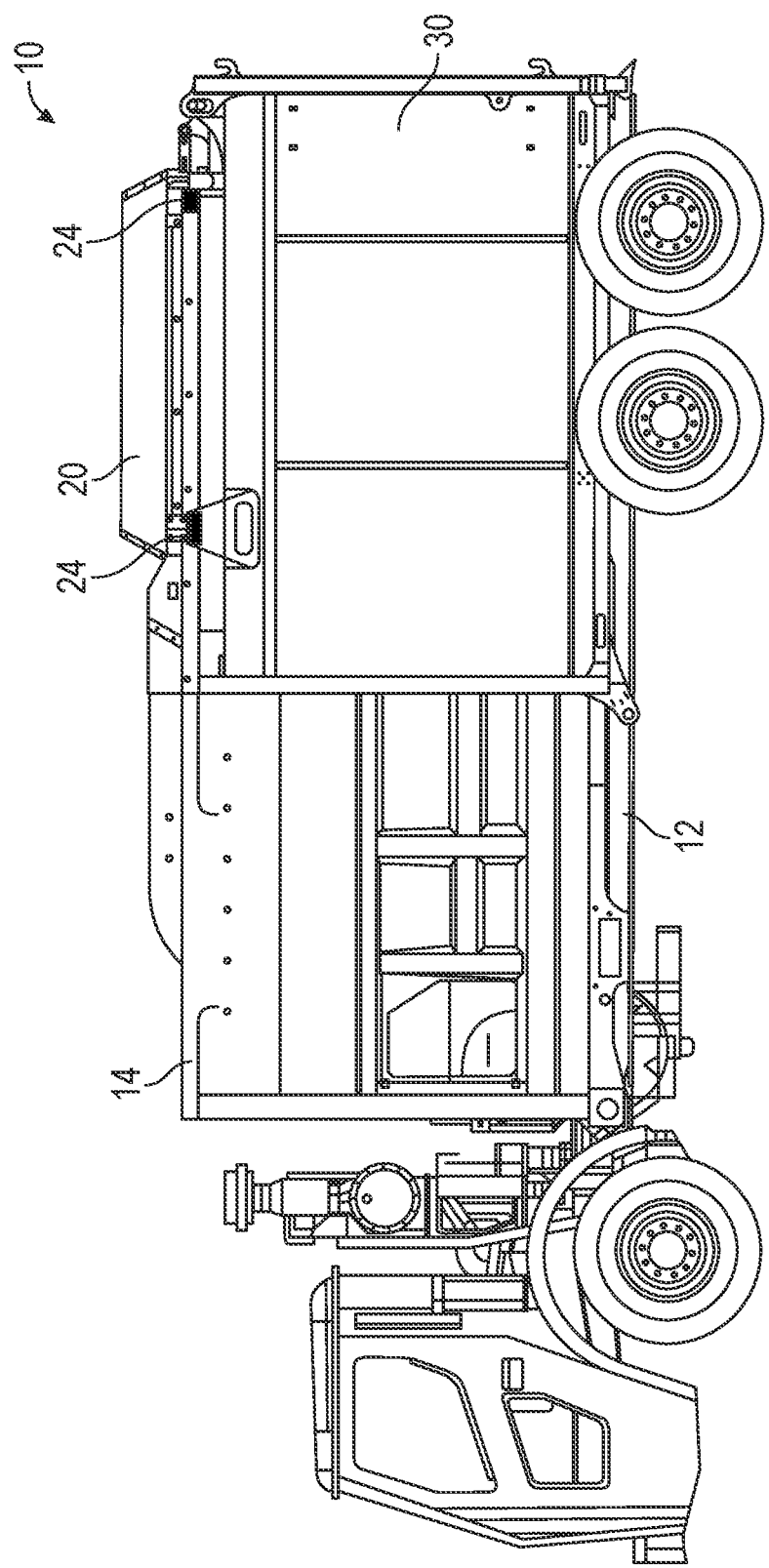
FIG. 3 is a side view of a refuse container of the refuse vehicle of FIG. 1 having a top energy storage and/or generation system, according to an exemplary embodiment.

Referring now to FIGS. 3-8, several illustrations of an exemplary placement of the energy storage and/or generation system 20 is shown, according to several exemplary embodiments. In various embodiments, the energy storage and/or generation system 20 is coupled to a rearward top portion of the refuse vehicle 10 (e.g., above the refuse compartment 30, etc.). As shown in FIG. 3, the energy storage and/or generation system 20 is coupled to the rearward top portion of the body 14. In other embodiments, the energy storage and/or generation system 20 is coupled to the forward top portion of the body 14. In some embodiments, the energy storage and/or generation system 20 is removable/detachable from the body 14. Locating the energy storage and/or generation system 20 on top of the body 14 facilitates easy access to the energy storage and/or generation system 20. For example, a user may readily inspect and service the energy storage and/or generation system 20 because it is located on an external surface of the refuse vehicle 10. Vibration isolation devices 24 are fixed underneath the energy storage and/or generation system 20 at the front and back ends of the energy storage and/or generation system 20, such that the vibration isolation devices 24 provide vibration dampening functionality at points of contact between the energy storage and/or generation system 20 and the body 14. Because the energy storage and/or generation system 20, in this embodiment, is located vertically above the wheels and are relatively distanced from them, the vibration caused by the motion of the wheels is exaggerated and the vibration reduction from the vibration isolation devices 24 is of increased importance. As such, in this embodiment, the vibration isolation devices 24 may include a greater amount of vibration reduction ability, such as from the inclusion of additional coil springs, thicker rubber mats, etc.

The energy storage and/or generation system 20 may include one or more attachment mechanisms (e.g., pins, linkages, latches, etc.) to couple the energy storage and/or generation system 20 to the body 14. In some embodiments, the energy storage and/or generation system 20 is a pod or battery compartment, configured to receive and electrically couple one or more batteries. For example, the energy storage and/or generation system 20 may allow a battery cell to be inserted from one end thereby coupling the battery cell to the energy storage and/or generation system 20 and providing power to the refuse vehicle 10. In some embodiments, the energy storage and/or generation system 20 is modular and facilitates easy replacement of one or more battery cells. For example, a second fully charged battery cell may replace a first depleted battery cell by uncoupling the first battery cell from the energy storage and/or generation system 20 and replacing it with the second battery cell. In some embodiments, the entire energy storage and/or generation system 20 is replaced with a different one of energy storage and/or generation system 20. Replacing one or more battery cells of the energy storage and/or generation system 20 reduces the downtime associated with charging a typical battery system. In some embodiments, the energy storage and/or generation system 20 is "hot-swappable" and is able to replace one or more battery cells without cutting power to the refuse vehicle 10.

In some embodiments, the vibration isolation devices 24 are fixed to the refuse vehicle 10, such that the vibration isolation devices 24 remain in place when the energy storage and/or generation system 20 is decoupled. In other embodiments, the vibration isolation devices 24 are coupled to the energy storage and/or generation system 20 such that the vibration isolation devices 24 remain connected to the energy storage and/or generation system 20 when the energy storage and/or generation system 20 is removed for replacement. In these embodiments, the vibration isolation devices 24 may be fixed to the entire system 20 or to each individual battery cell. In either of the embodiments, the vibration isolation devices 24 are located at one or more points of contact between the energy storage and/or generation system 20 and the refuse vehicle 10 at all times during operation. In those embodiments in which the energy storage and/or generation system 20 includes one or more battery cells, the vibration isolation devices 24 may be fixed within the energy storage and/or generation system 20 such that the vibration isolation devices 24 reduce or divert the disruptive forces caused by one battery cell coming in contact with another due to vibration from the refuse vehicle 10. In further embodiments, the vibration isolation devices 24 are neither fixed to the refuse vehicle 10 nor fixed to the energy storage and/or generation system 20, such that the vibration isolation devices 24 are a separate component and independently configurable.

The energy storage and/or generation system 20 may include an electric connection (e.g., a pantograph, a current collector, a high-voltage line, etc.) to allow the energy storage and/or generation system 20 to connect to external power sources (e.g., an overhead power line, the grid, a charging station, etc.). For example, the energy storage and/or generation system 20 may include a charging port to allow one or more battery cells to be charged while the energy storage and/or generation system 20 is coupled to the refuse vehicle 10 (e.g., by a 220V charger). In some embodiments, the energy storage and/or generation system 20 includes an electrical bypass to power the refuse vehicle 10 from a charging source while the battery is being charged. In some embodiments, the energy storage and/or generation system 20 connects to one or more power sources of refuse vehicle 10 (e.g., an internal combustion generator, a battery, etc.) to charge the energy storage and/or generation system 20. For example, the energy storage and/or generation system 20 may include a connection to an onboard diesel generator configured to provide power to the energy storage and/or generation system 20 for charging.

Figure 4:
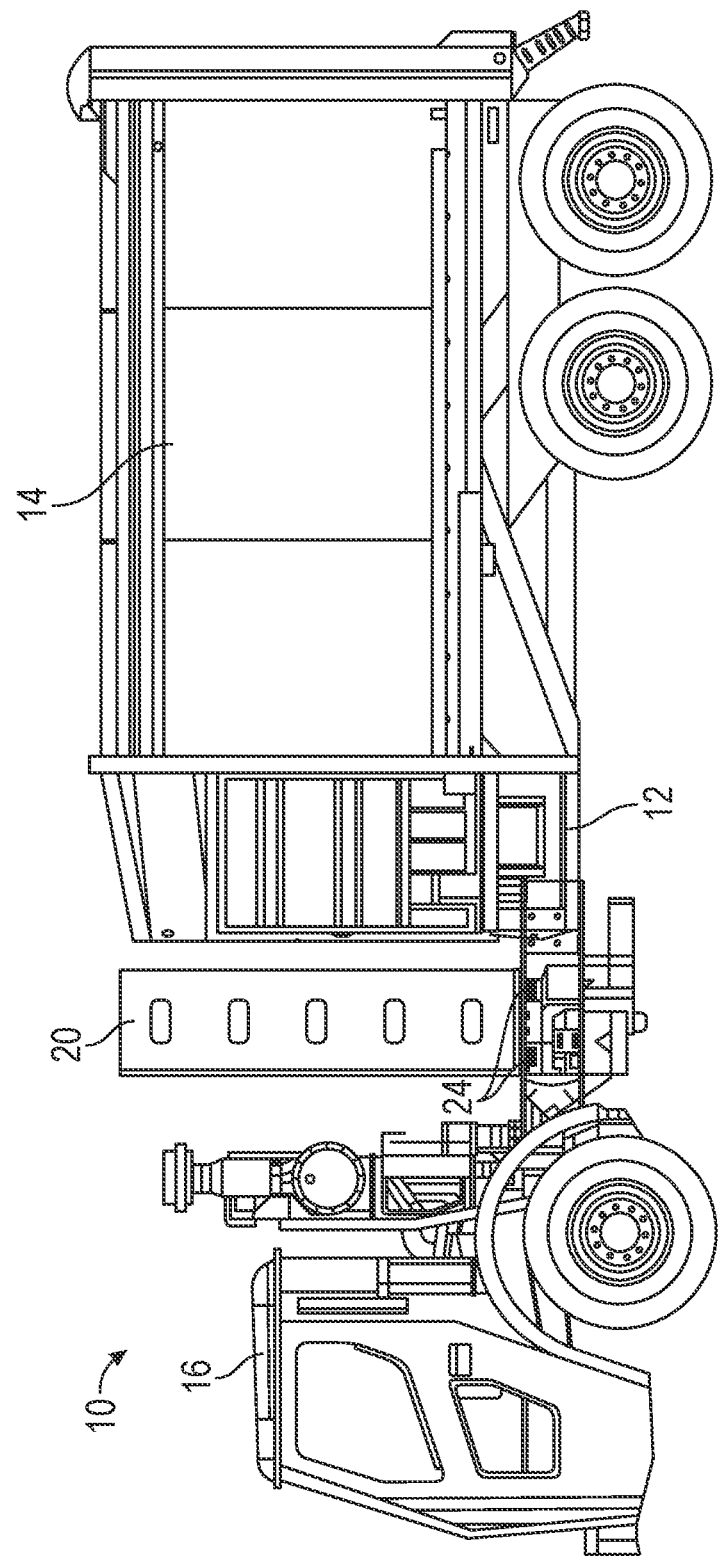
FIG. 4 is the refuse vehicle of FIG. 1 having a centralized energy storage and/or generation system, according to an exemplary embodiment.

As shown in FIG. 4, the energy storage and/or generation system 20 is coupled between the cab 16 and the body 14. In some embodiments, the energy storage and/or generation system 20 is coupled to the frame 12. In these embodiments, vibration isolation devices 24 are fixed beneath the energy storage and/or generation system 20 such that the energy storage and/or generation system 20 does not make direct contact with the frame 12. Locating the energy storage and/or generation system 20 between the cab 16 and the body 14 reduces a rear weight of the refuse vehicle 10, thereby reducing component stress of weight bearing members (e.g., a rear axle). Furthermore, centrally locating the energy storage and/or generation system 20 protects the energy storage and/or generation system 20 from damage in the event of a collision. Furthermore, centrally locating the energy storage and/or generation system 20 allows easy modification/retrofitting of existing refuse vehicles to include the energy storage and/or generation system 20. The energy storage and/or generation system 20 may be easily accessed and/or removed from the refuse vehicle 10. For example, the energy storage and/or generation system 20 may include forklift pockets so that a forklift may easily remove the energy storage and/or generation system 20 from the refuse vehicle 10. In some embodiments, the energy storage and/or generation system 20 includes one or more eyelet connectors to receive a lifting hook or similar hoisting attachment. The energy storage and/or generation system 20 may be configured to connect to an external rail system to quickly replace the energy storage and/or generation system 20 by sliding it orthogonally off the refuse vehicle 10. In this embodiment, the vibration isolation devices 24 are oriented on the refuse vehicle 10 and/or the energy storage and/or generation system 20 so as to not interfere with the external rail system.

In some embodiments, the energy storage and/or generation system 20 is configured to dynamically change position on the refuse vehicle 10 based on loading of the refuse vehicle 10. For example, the energy storage and/or generation system 20 may translate horizontally along the frame 12 toward the cab 16 or toward the body 14 to change a weight distribution of the vehicle. In some embodiments, the energy storage and/or generation system 20 includes one or more controllers to measure the weight distribution of the refuse vehicle 10 and adjust a position of the energy storage and/or generation system 20 accordingly.

Figure 5:
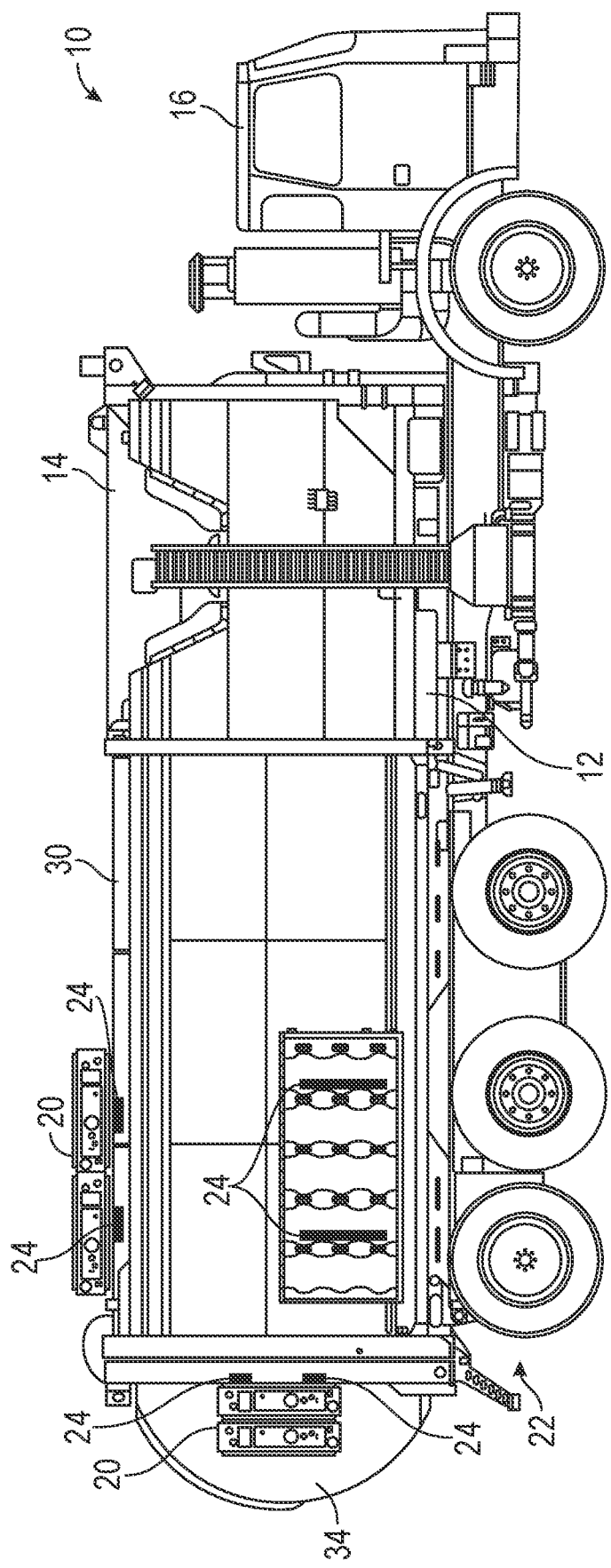
FIG. 5 is the refuse vehicle of FIG. 1 having a distributed energy storage and/or generation system, according to an exemplary embodiment.
Figure 6:
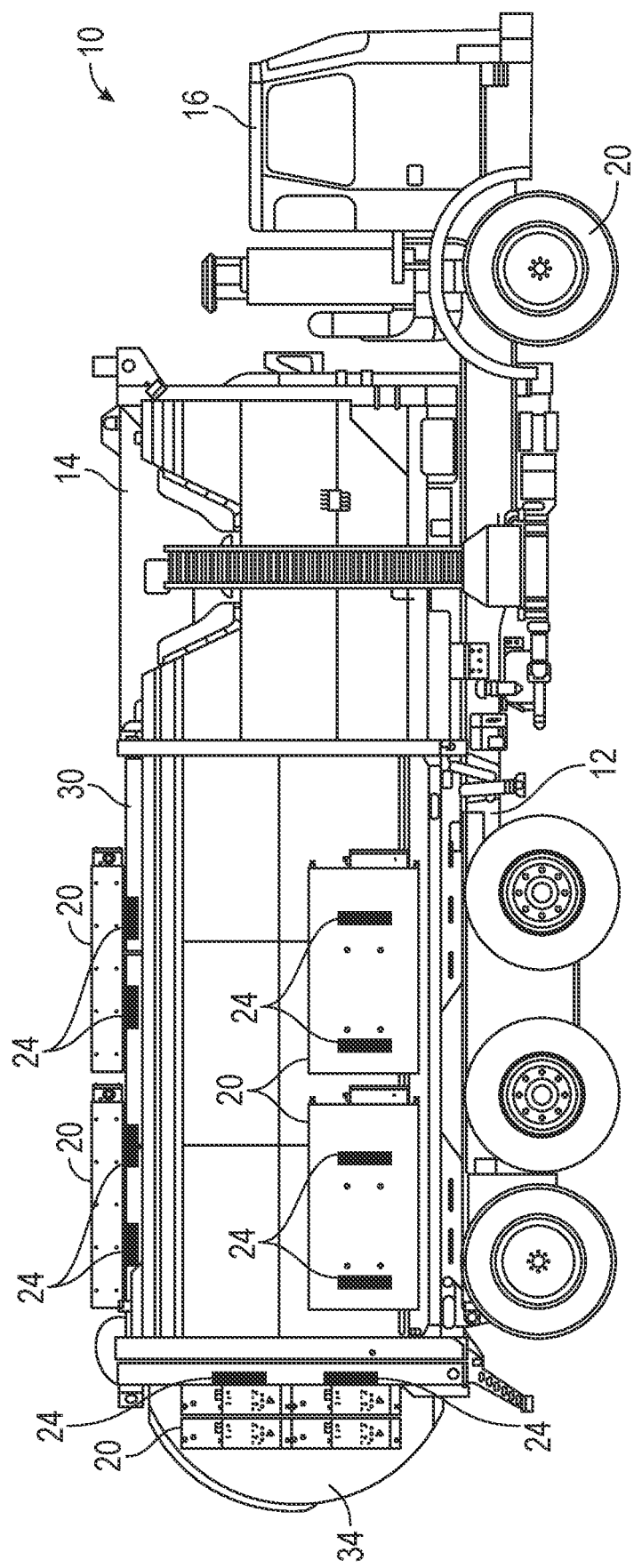
FIG. 6 is the refuse vehicle of FIG. 1 having a distributed energy storage and/or generation system, according to an exemplary embodiment.
Figure 7:
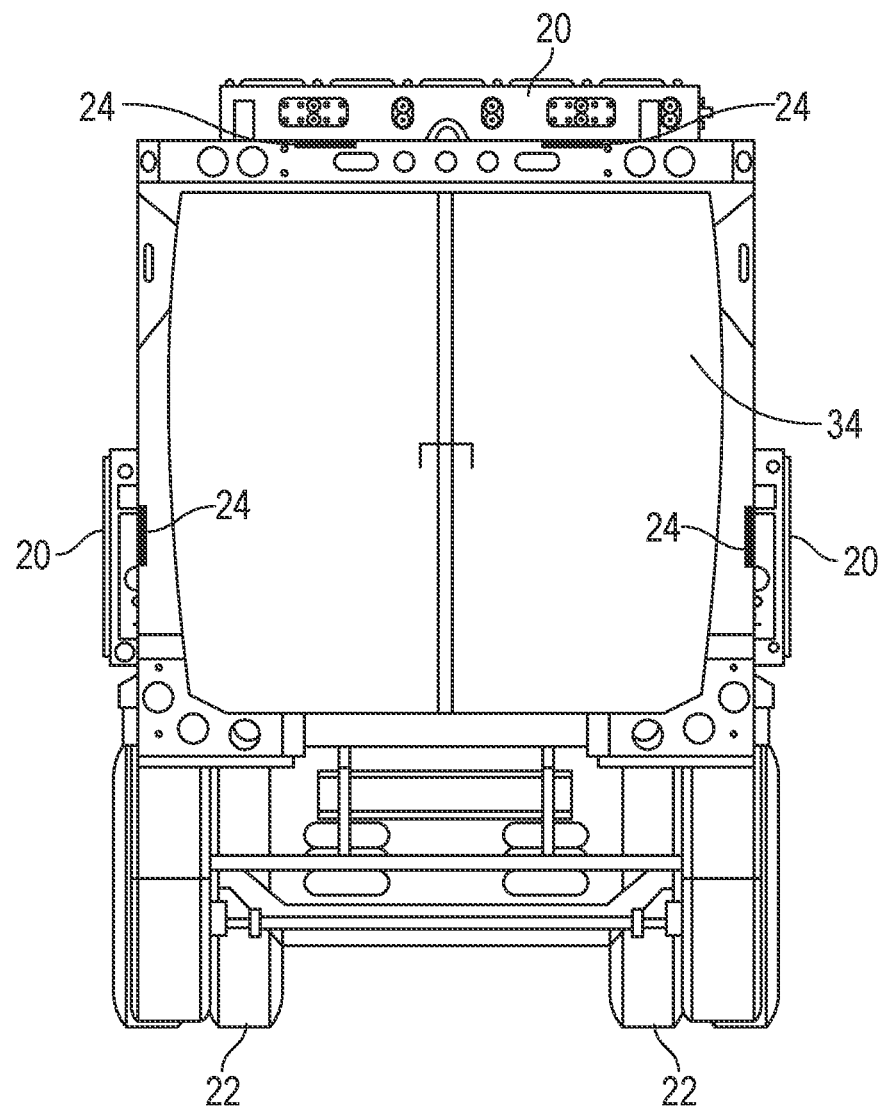
FIG. 7 is the refuse vehicle of FIG. 1 having a distributed energy storage and/or generation system, according to an exemplary embodiment.

Additionally or alternatively, the energy storage and/or generation system 20 is coupled to a rearward portion of the refuse vehicle 10. For example, the energy storage and/or generation system 20 may be coupled to the tailgate 34 and/or a rearward portion of the refuse compartment 30 (e.g., as shown in FIGS. 5-7). In this example, vibration isolation devices 24 are fixed between the energy storage and/or generation system 20 and the tailgate 34 and/or rearward portion of the refuse compartment 30 in order to divert or reduce vibration and similar disruptive forces from impacting functionality of the energy storage and/or generation system 20. Because the batteries are located closely to the wheels, which produce a majority of vibration experienced by the energy storage and/or generation system 20, the vibration isolation devices 24 must be prepared to reduce higher levels of vibration. As a result, the vibration isolation devices 24 may include a greater amount of vibration reduction ability, such as from the inclusion of additional coil springs, thicker rubber mats, etc.

Figure 8:
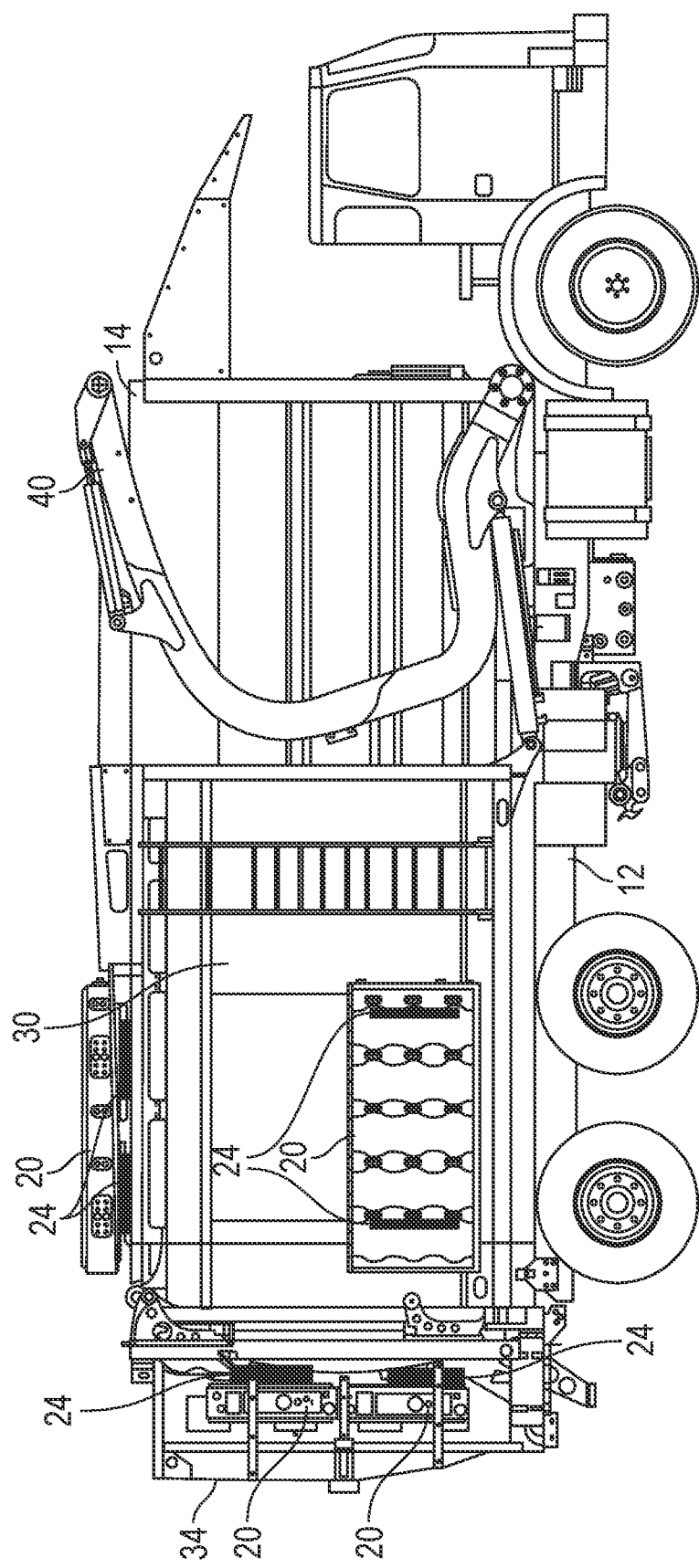
FIG. 8 is the refuse vehicle of FIG. 1 having a distributed energy storage and/or generation system, according to an exemplary embodiment.

As another example, the energy storage and/or generation system 20 may be coupled to a vertical rear surface of the refuse compartment 30. In various embodiments, placement of the energy storage and/or generation system 20 as shown in FIGS. 5-7 facilitates shifting weight rearward on the refuse vehicle 10, thereby reducing strain on forward load bearing components (e.g., a front axle, etc.). In these embodiments, vibration isolation devices 24 are fixed between the energy storage and/or generation system 20 and the vertical rear surface of the refuse compartment 30 in order to divert or reduce vibration and similar disruptive forces from impacting functionality of the energy storage and/or generation system 20. In some embodiments, the placement of the energy storage and/or generation system 20 shown in FIGS. 5-7 is preferred for a rear-loading refuse vehicle 10. In various embodiments, the energy storage and/or generation system 20 includes a different number and/or arrangement of components than shown explicitly in the FIGURES. In some embodiments, the placement of the energy storage and/or generation system 20 shown in FIG. 8 is preferred for a front-loading refuse vehicle 10 and/or a side-loading refuse vehicle 10. In various embodiments, the energy storage and/or generation system 20, or components thereof, are detachable from the refuse vehicle 10 as described in detail above. In these detachable embodiments, the vibration isolation devices 24 may be fixed either to the refuse vehicle 10, such that the vibration isolation devices 24 remain in place when the energy storage and/or generation system 20 is removed for replacement, or to the energy storage and/or generation system 20 itself, such that the vibration isolation devices 24 are similarly removed and replaced with the energy storage and/or generation system 20.

Figure 9:
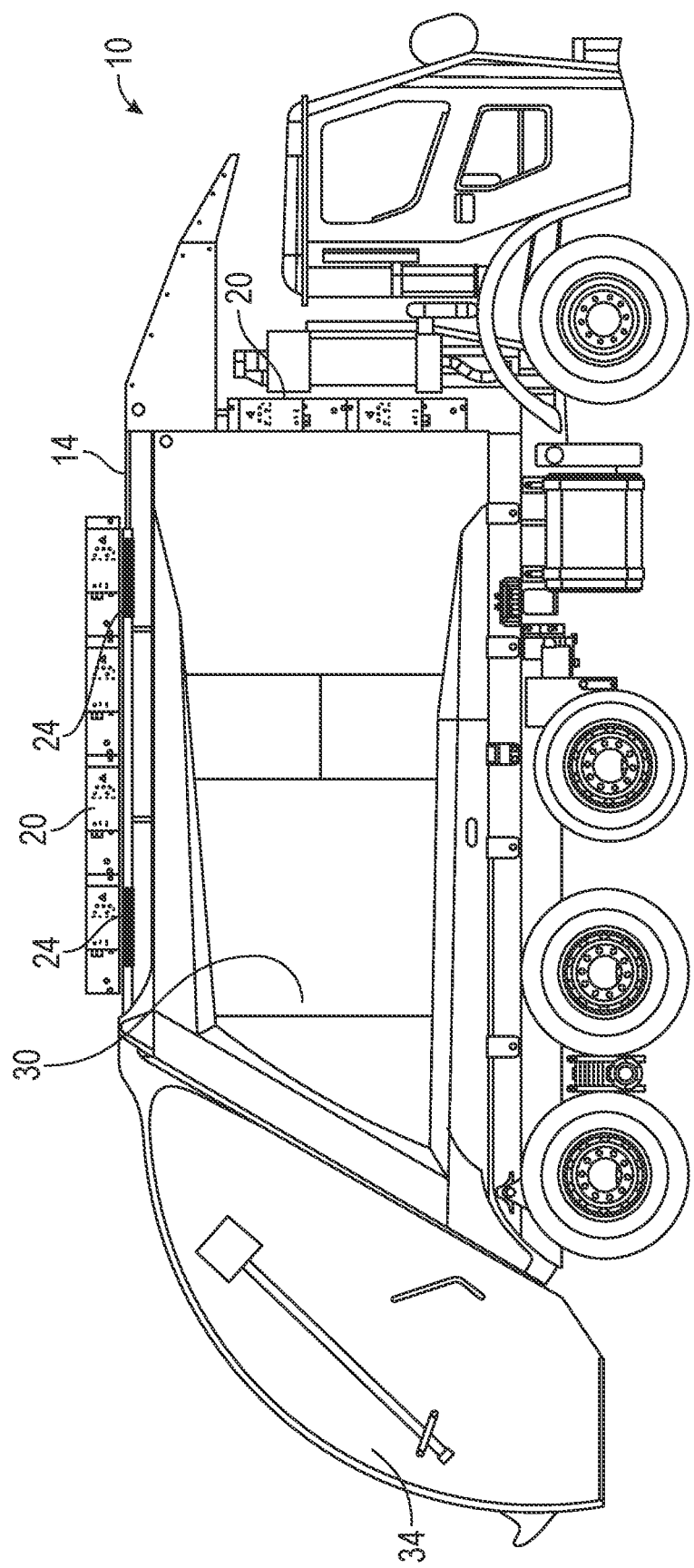
FIG. 9 is the refuse vehicle of FIG. 1 having a top energy storage and/or generation system, according to an exemplary embodiment.
Figure 10:
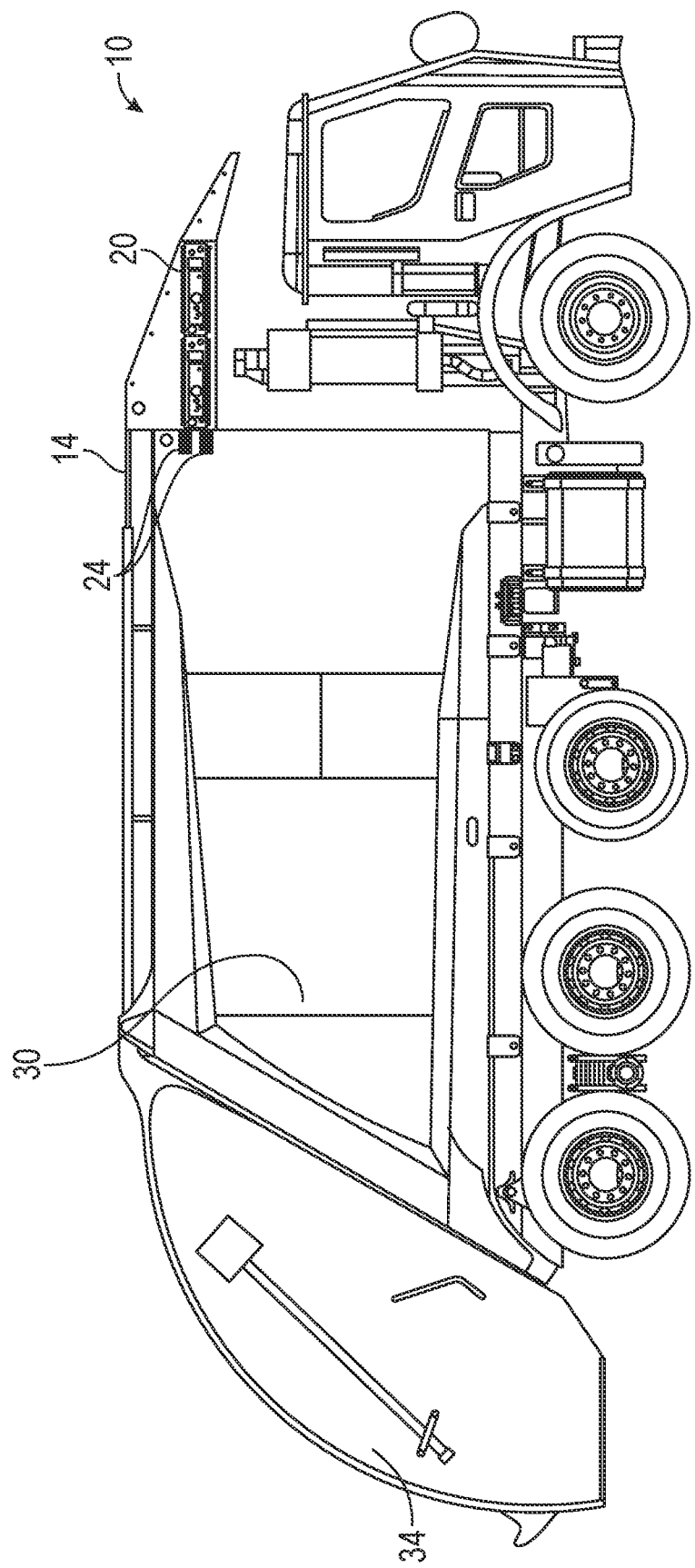
FIG. 10 is the refuse vehicle of FIG. 1 having a top energy storage and/or generation system, according to an exemplary embodiment.

Referring now to FIGS. 9-10, several illustrations of another exemplary placement of the energy storage and/or generation system 20 is shown, according to several exemplary embodiments. In various embodiments, the energy storage and/or generation system 20 is coupled to a top portion of the refuse vehicle 10. For example, the energy storage and/or generation system 20 may be coupled to a top portion of refuse compartment 30 and/or above the cab 16 (e.g., as shown in FIGS. 9-10). In some embodiments, the energy storage and/or generation system 20 is coupled to a canopy (or other structural element) located above the cab 16. In these embodiments, vibration isolation devices 24 are fixed underneath the energy storage and/or generation system 20 at the front and back ends of the energy storage and/or generation system 20, such that the vibration isolation devices 24 provide vibration dampening functionality at points of contact between the energy storage and/or generation system 20 and the body 16. Because the energy storage and/or generation system 20, in this embodiment, is located vertically above the wheels and are relatively distanced from the wheels, the vibration caused by the motion of the wheels is exaggerated and the vibration reduction from the vibration isolation devices 24 is of increased importance. As such, in this embodiment, the vibration isolation devices 24 may include a greater amount of vibration reduction ability, such as from the inclusion of additional coil springs, thicker rubber mats, etc. In some embodiments, the placement of the energy storage and/or generation system 20 shown in FIGS. 9-10 is preferred for a rear-loading refuse vehicle 10. In various embodiments, the placement of the energy storage and/or generation system 20 as shown in FIGS. 9-10 facilitates moving weight (e.g., battery weight, etc.) forward on the refuse vehicle 10 (e.g., toward the cab 16 and away from the tailgate 34, etc.), thereby reducing stress on rear load-bearing components (e.g., a rear axle, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle, comprising:
a chassis;
a body assembly coupled to the chassis, the body assembly defining a refuse compartment;
a lift assembly movably coupled to the chassis and configured to provide refuse into the refuse compartment;
an electric energy system, the electric energy system comprising one or more battery cells and control hardware, the electric energy system coupled to the body assembly and configured to be accessed through an opening in the body assembly; and
one or more vibration isolation devices, the one or more vibration isolation devices structured to reduce an effect of disruptive forces on the electric energy system.

2. The refuse vehicle of claim 1, wherein the electric energy system is removably coupled to the body assembly, and wherein the one or more vibration isolation devices are fixedly coupled to the electric energy system.

3. The refuse vehicle of claim 1, wherein the electric energy system is removably coupled to the body assembly, and wherein the one or more vibration isolation devices are fixedly coupled to the body assembly.

4. The refuse vehicle of claim 1, wherein the one or more vibration isolation devices comprise at least one of coil springs, rubber pads, elastomer springs, gas shocks, or silicone padding.

5. The refuse vehicle of claim 4, wherein the electric energy system is coupled to a substantially vertical panel of the refuse compartment, wherein the one or more vibration isolation devices is positioned at least partially between the substantially vertical panel of the body assembly and the electric energy system.

6. The refuse vehicle of claim 1, wherein the one or more vibration isolation devices comprise at least one hydraulic cylinder, the at least one hydraulic cylinder structured to alter a position of the electric energy system.

7. The refuse vehicle of claim 6, the refuse vehicle further comprising a controller, the controller configured to:
receive data from a sensor;
determine, based on the received data, an amount of adjustment for the at least one hydraulic cylinder; and
transmit, based on the determined amount of adjustment, a signal to a hydraulic pump to alter an amount of hydraulic fluid in the at least one hydraulic cylinder.

8. The refuse vehicle of claim 7, wherein the signal is transmitted to the hydraulic pump in order to affect the amount of hydraulic fluid in the at least one hydraulic cylinder before a disruptive force occurs.

9. An electric energy system for a vehicle, comprising:
one or more battery cells structured to couple to an exterior surface of a refuse compartment of the vehicle; and
one or more vibration isolation devices positioned proximate to the one or more battery cells and structured to be positioned between the one or more battery cells and the exterior surface of the refuse compartment, the one or more vibration isolation devices structured to reduce an effect of a disruptive force on the one or more battery cells during operation of the vehicle, wherein the one or more battery cells are configured to provide electrical power to the vehicle.

10. The electric energy system of claim 9, wherein the exterior surface of the refuse compartment is a substantially vertical exterior surface, wherein the one or more vibration isolation devices are positioned proximate to a point of contact between the one or more battery cells and the substantially vertical exterior surface of the vehicle.

11. The electric energy system of claim 9, further comprising:

a sensor configured to record data associated with the vehicle or the one or more vibration isolation devices; and a controller communicably coupled to the sensor and to the one or more vibration isolation devices, the controller configured to affect the operation of at least one of the one or more vibration isolation devices based on data from the sensor.

12. The electric energy system of claim 11, wherein the at least one of the one or more vibration isolation devices comprise a hydraulic cylinder.

13. The electric energy system of claim 12, wherein the controller is further configured to:

determine, based on the data from the sensor, an amount of adjustment for the hydraulic cylinder; and cause a hydraulic pump to alter a volume of hydraulic fluid of the hydraulic cylinder by the amount of adjustment.

14. The electric energy system of claim 9, wherein the one or more vibration isolation devices comprise an adjustable vibration isolation device and a nonadjustable vibration isolation device, wherein the adjustable vibration isolation device is configured to be adjusted based on data from one or more sensors.

15. The electric energy system of claim 14, wherein the adjustable vibration isolation device is a hydraulic cylinder and the nonadjustable vibration isolation device is at least one of a coil spring, rubber pad, elastomer spring, gas shock, or silicone pad.

* * * * *